United States Patent
Baba et al.

[11] 3,766,378
[45] Oct. 16, 1973

[54] MOVING OBJECT AUTOMATIC OPERATION SYSTEM

[75] Inventors: Takeshi Baba, Itabashi-ku, Tokyo; Tadao Yaku, Toshima-ku, Tokyo; Hisao Nakajima, Musashino City, Tokyo; Toshihiko Kishimoto, Nakano-ku, Tokyo; Kenichi Yoshida, Konohana-ku, Osaka, all of Japan

[73] Assignees: Japanese National Railways, Tokyo; Sumitomo Electric Industries, Ltd., Osaka both of Japan

[22] Filed: June 3, 1971

[21] Appl. No.: 149,554

[52] U.S. Cl............... 246/63 C, 246/30, 333/97 R, 343/771
[51] Int. Cl............................................. B61l 27/04
[58] Field of Search......................... 246/30, 29 R, 8, 246/63 C, 187 B, 182 R, 182 C; 179/82; 340/23, 47; 333/97 R, 84 L; 343/771, 770

[56] References Cited
UNITED STATES PATENTS 3,629,707  12/1971  Baba et al............................ 246/30
3,457,403  7/1969  Smith, Jr.......................... 246/187 R

FOREIGN PATENTS OR APPLICATIONS 467,690  3/1969  Switzerland..................... 246/182 B

OTHER PUBLICATIONS

Baba, et al., "Leaky Coaxial Cable with Slot Array," Advanced Abstract 1968 IEEE Symposium on Antennas and Propagation, p. 253.

Primary Examiner—Gerald M. Forlenza
Assistant Examiner—George H. Libman
Attorney—Carothers & Carothers

[57] ABSTRACT

A moving object automatic operation system wherein moving objects travelling along a route are operated automatically in accordance with the data derived from the signal detected by an antenna aboard the moving object which is coupled with the alternating magnetic field produced along a leaky coaxial cable, together with a predetermined location speed operation curve for each section of the route.

4 Claims, 8 Drawing Figures

3,766,378

MOVING OBJECT AUTOMATIC OPERATION SYSTEM

BACKGROUND OF THE INVENTION

1. Field of the Invention

The present invention relates to a moving object automatic operation system.

2. Description of the Prior Art

For an automatic moving object operation control, it has been heretofore known that the number of revolutions of the wheel may be counted and the travelling distance and speed derived from said count data.

In such a system however, spurious revolutions due to slipping of the wheels and/or diameter change due to wear on the wheels cause integrated error in the information used for the operation control. Accordingly, the accurate operation control of the moving object can not be expected. Another automatic vehicle control system is disclosed by U.S. Pat. No. 3029893, whereby two wires are embedded under the surface of the route and are periodically crossed for the transmission of guidance signals. As this system has the transmission line embedded under the road way, it suffers from interference from rain and snow and the transmission characteristics are further greatly affected by the transmission impedance disturbance created by the occupancy of the moving objects on the road way. Consequently, a stable automatic operation with high reliability cannot be expected.

Another similar known system is disclosed by U.S. Pat. No. 3,327,111. In this system, a special purpose transmission line made of three conductors and two different frequency signal sources are provided.

This system has a disadvantage in that the transmission line for moving object control may be used only for a single purpose so that another cable for communication must be installed in parallel to said transmission line for operation control, while recently, many different communications are required for transmission to vehicles at the same time.

SUMMARY OF THE INVENTION

The present invention basically provides a leaky coaxial cable having many slots which are arranged in the outer conductor and which produce alternately reverse polirized magnetic fields. The cable is laid along the route of a moving object and transmits an electric current having a wave length sufficiently longer than the interval of adjacent slots in the waveguide. An antenna coupling with the alternating magnetic field is also provided.

When a moving object travels along the route, the antenna of the moving object couples with the alternating magnetic fields having the same period as the slot interval of the cable, so that it can detect the distance travelled by counting the periodicity, and the speed of the moving object by the ratio between the travelling distance and it can detect time.

The moving object is able to be operated automatically by a data processing and controlling device in accordance with said detected information and used in combination with a predetermined location speed operation curve of the section where the moving object travels.

DESCRIPTION OF THE PREFERRED EMBODIMENTS

Figure 1:
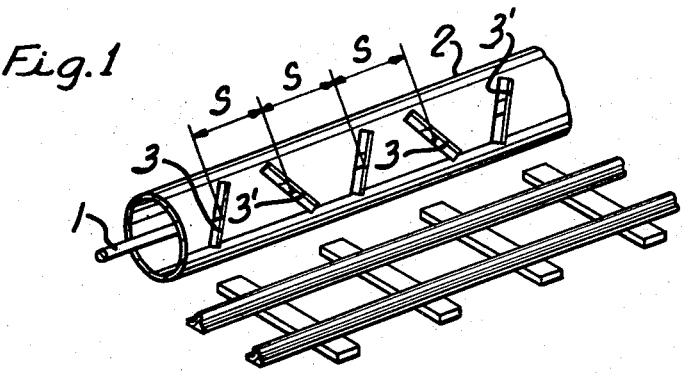
FIG. 1 is an illustrative perspective view of the leaky coaxial cable laid along a vehicle track illustrating the present invention.

The moving object automatic operation system according to the present invention will be explained by referring to the drawings. FIG. 1 shows one coaxial transmission line used for the automatic operation of moving objects according to this invention. The line is installed along the vehicle track.

In FIG. 1, (1) denotes the central conductor of the line, (2) its outer conductor, and (3) and (3') indicate the inclined slots which are reversed as to physical layout one to the next in said outer conductor at a constant center to center interval S, i.e., their inclination is alternately reversed. That is to say, the leaky coaxial cable shown in FIG. 1 is a coaxial cable having an outer conductor in which a large number of slots are cyclically positioned in such a manner that adjacent slots are symmetrical with respect to a midway plane between them and positioned normal to the axis of the coaxial cable. The slots are also regulated such that the projections of the center line of any of said slots on a plane parallel to the axis and on said midway plane are finite.

Figure 2A:
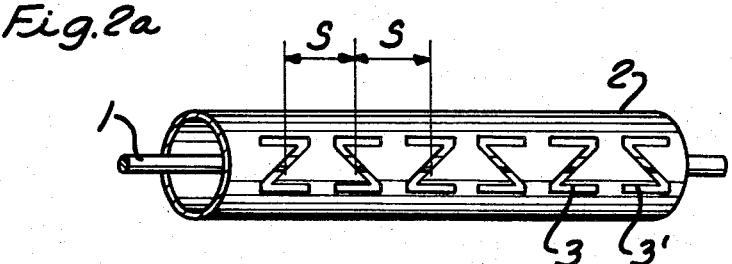
FIGS. 2 (a) and (b) are perspective views of illustrative sections of different examples of leaky coaxial cables may be for the system of the present invention.
Figure 2B:
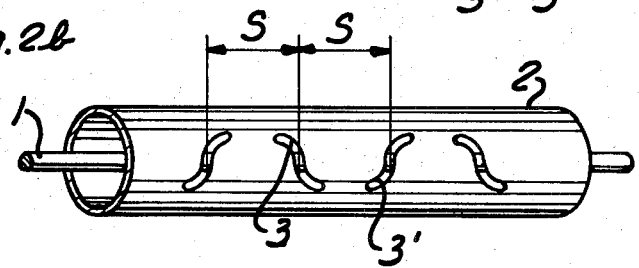
Figure 3:
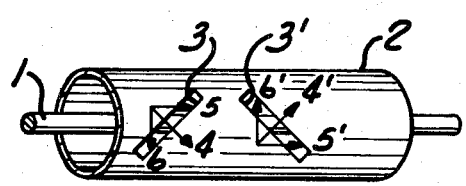
FIG. 3 is a drawing superimposed over a coaxial cable of the type useable in the system of the present invention showing the electric fields appearing at the slots and vectorially divided in two directions.
Figure 4:
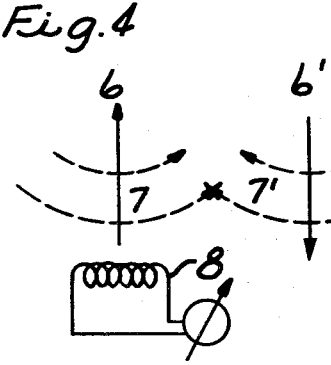
FIG. 4, graphically illustrates the electro-magnetic fields appearing at the slots along a coaxial cable used in the system of the present invention.

Modifications of the coaxial cables as shown in FIG. 1 are illustrated in FIG. 2. In FIG. 2, the same numerals as the numerals of FIG. 1 show the same part in FIG. 1. If an electromagnetic wave having a wavelength sufficiently longer than the distance S between said adjacent slots is caused to flow in these coaxial cables, electric fields (4) and (4') are produced at the slots (3) and (3') of the outer conductor (2) in directions normal to said slots as shown in FIG. 3. If these electric fields are vectorially divided in two directions, the direction of the axis of the line and the direction normal thereto, the electric field components (6) and (6') normal to the axis are directed in opposite directions, while the electric field components (5) and (5') in the axial direction are in one and the same direction. FIG. 4 shows electric field components (6) and (6') normal to said axis separated out for each location of the slots. The reverse polarized magnetic fields (7) and (7') produced by said electric fields (6) and (6') also appear alternately slot by slot. An antenna coil (8) is arranged and fixed so as to receive the magnetic field components in the axial direction of the transmission line and is installed aboard a train travelling along a coaxial cable.

Figure 5:
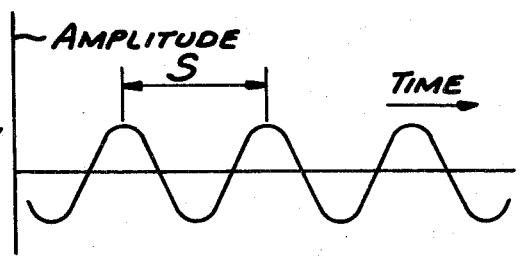
FIG. 5 graphically illustrates an alternating magnetic fields produced along the coaxial cable used in the system of the present invention.

The alternating magnetic fields, which are reversed at every adjacent slots, are received by the antenna of the moving object when it travels along the track. The received signal is intense at the portions along the cable where slots are present and is scarcely received at the portions therealong where the slots are not present. Accordingly, the wave form of the received signal has a periodicity which is the same pitch as the fixed interval S between adjacent slots, as shown in FIG. 5. By counting the number of these pulses of the received signal on board the moving object, it is possible to determine the travelling distance of the moving object on the basis of the fixed distance S and to determine its location from a given starting point. It is also possible to determine the speed of the moving object from the ratio between the travelling distance and time elapsed. Moreover, it is possible also to determine the acceleration. In this case, the accurate determination of the location is dependent upon accurately counting the number of the distances S between slots which have passed such that in turn the accuracy of location and speed detections also depends on the accuracy of the measured length along the coaxial made up of multiples of the interval S.

Figure 6:
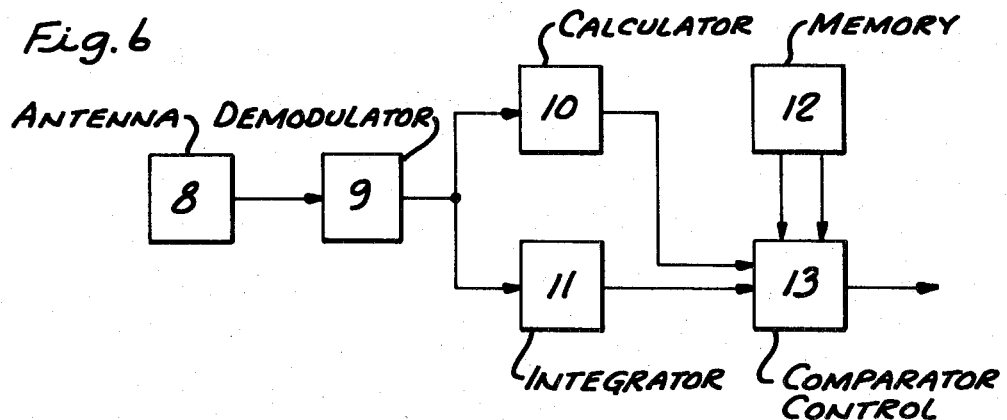
FIG. 6 is a block circuit diagram of the automatic operation system of the present invention.
Figure 7:
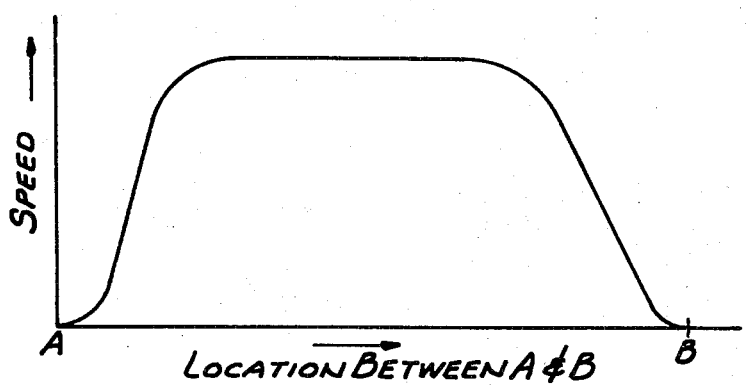
FIG. 7 graphically illustrates a curve for a location-speed operation curve of a section of the track for the system of the present invention.

FIG. 6 is a block diagram of a data processing and control device of the moving object automatic operation system according to this invention. FIG. 7 shows a speed-location operation curve for a predetermined section, for example, a section between two adjacent stations previously memorized in a device aboard the train or in a data processing device on the ground. In FIG. 6, (8) denotes an antenna aboard the train which makes induction coupling with the coaxial cable with zigzag slots as previously described. Usually a coil with a ferrite core is used. (9) denotes a demodulator which demodulates the signal received by the antenna (8) and converts the level changes of the received signal into a pulse series. (10) denotes a calculating circuit which counts said pulse series over a given period of time and thereby calculates the speed, the speed V being given by V = NS, where N is the number of pulses in a unit time and S the distance between slots. (11) denotes a integration circuit which integrates the number of pulses and thereby calculates the location of the train on a section. (12) denotes a memory circuit which memorizes or retains the location-speed curves for each particular section along the track as shown in FIG. 7 In other words, the memory device electrically memorizes the operation pattern of each train to be followed in terms of a function representing the desired relationship between the location and speed of the train for each particular different section of track, as between stations of different spacings. (13) denotes a comparing and control circuit which compares the location-speed operation curve ascribed to a particular section by the memory circuit where the moving object travels with the actual detected data of the location and speed of the moving object as determined by calculator 10 and integrator 11.

"The comparing and control circuit electronically compares the stored operation pattern function with the actual operation pattern and detects the deviation from the standard memorized pattern, thereby issuing signals for acceleration or deceleration as required to make the vehicle movement conform to the prescribed pattern throughout the given section of travel. Each of the block elements in FIG. 6 are considered to be obvious to design by application of standard electrical engineering principals of logic circuit design once one has been informed of the function to be performed by each circuit.

The data processing and control device may be installed aboard each moving object, or by another way may, be installed at a central ground station. When the data processing and control device is provided at a ground station, it is necessary to prepare a data transmission system sending the received signal of the antenna to the central ground station.

If a zigzag slot coaxial cable is installed on the ground as shown in FIG. 1 and an apparatus as explained by FIG. 6 is installed aboard a train as mentioned above, then it is possible to control the operation of the train automatically at a fixed position. In this case, the required accuracy of the operation control is determined by the interval S between the slots of the coaxial cable. The accuracy of the control can be enhanced directly by enhancing the accuracy of the slot intervals of the coaxial cable which is determined by the manufacturing thereof. The accuracy of the control of this system does not change according to not only the timing factor but also other factors.

The apparatus detecting the speed and the travelling distance is very simple and is not interfered with by outer conditions, for example, weather conditions and others.

According to this invention, a single leaky coaxial cable is not only used for moving object operation control, but is also used for the vehicle communication at the same time.

Consequently, the system of the present invents is very stable, reliable and economical when compared with the conventional systems.

What we claim is:

1. A moving object automatic operation system comprising a coaxial cable installed in parallel to a track of a moving object and having a longitudinal array of slots in its outer conductor such that adjacent slots are symmetrically reversed with respect to a plane midway between them and normal to the axis of the coaxial cable and the projections of the center line of any of the slots on a plane parallel to the axis and on said midway plane are finite, a coupling coil installed aboard a moving object on said track and which couples electromagnetically with said coaxial cable, a data processing and controlling device provided on the moving object which receives signals from said coupling coil and controls the moving object by comparing a predetermined location-speed operation curve ascribed to the section of said track over which said moving object is travelling with the actual data of the location and speed of said moving object received by way of said coupling coil.

2. A moving object automatic operation system comprising a coaxial cable installed in parallel to a track of a moving object and having a longitudinal array of slots in its outer conductor such that adjacent slots are symmetrically reversed with respect to a plane midway between them and normal to the axis of the coaxial cable and the projections of the center line of any of said slots on a plane parallel to the axis and said midway plane are finite, said coaxial cable transmitting an electromagnetic current having a wavelength sufficiently long as compared to the slot interval of said coaxial cable, an antenna coil installed aboard a moving object on said track which couples with the alternating magnetic fields produced by the slots of said cable, and a data processing and controlling device provided on said moving object; said data processing and controlling device having means for counting the number of level changes in the signal received by the antenna, means for detecting the location and speed of the moving object from the data of the counter number, means for memorizing a predetermined location-speed operation curve ascribed to each section of said track to be controlled and comparing controlling means which controls the moving object by comparing the location-speed operation curve ascribed to the section of track over which said moving object is travelling with the actual data of the location and speed of said moving object.

3. A moving object automatic operation system comprising a coaxial cable installed in parallel to a track of a moving object and having a longitudinal array of slots such that adjacent slots are symmetrically reversed with respect to a plane midway between them and normal to the axis of the coaxial cable and the projections of the center line of any of the slots on a plane parallel to the axis and said midway plane normal to the axis are finite, a coupling coil installed aboard said moving object and which couples electromagnetically with said coaxial cable, and a data processing and controlling means provided at a central ground station which controls at least one moving object on said track by comparing a location-speed operation curve ascribed to a section of said track on which said moving object is travelling with the actual data of the location and speed of said moving object received by way of said coupling coil.

4. A moving object automatic operation system comprising a coaxial cable installed in parallel to a track of a moving object and having a longitudinal array of slots with a constant slot interval such that adjacent slots are symmetrically reversed with respect to a plane midway between them and normal to the axis of the cable and the projections of the center line of any of the slots on a plane parallel to the axis and said midway plane are finite, said coaxial cable transmitting an electromagnetic current having a wavelength sufficiently long as compared to the slot interval on said coaxial cable, an antenna coil installed aboard a moving object on said track and which couples with the alternating magnetic fields provided by the slots of said cable, a data transmission device connected to said coaxial cable for sending the signal received by said antenna to a central ground station, and a data processing and control device provided at said ground station; said data processing and controlling device having means for counting the number of level changes of the signal received by the antenna, means for detecting location and speed of the moving object from the data of the counted number, means for memorizing a location-speed operation for each section of said track to be controlled and comparing controlling means which controls the moving object by comparing the location-speed operation curve ascribed to the section of track over which said moving object is travelling with the actual data of the location and speed of said moving object.

\* \* \* \* \*

UNITED STATES PATENT OFFICE
CERTIFICATE OF CORRECTION

Patent No. 3,766,378    Dated October 16, 1973

Inventor(s) Takeshi Baba, Tadao Yaku, Hisao Nakajima, Toshihiko Kishimoto and Kenichi Yoshida It is certified that error appears in the above-identified patent and that said Letters Patent are hereby corrected as shown below:

Title Page, between Entries [21] and [52] insert
"Foreign Application Priority Data
Japanese Application No. 51318/1970
filed June 2, 1970"

Col. 4, claim 1, line 45, after "," insert --each of said slots further having a slot configuration which is other than a symmetrical reversal mirror image of itself with respect to both a plane transverse to and a plane parallel with said cable axis with both planes passing through the center of the slot configuration,-- claim 2, line 63, before "said" insert --on--; line 64, after "," insert --each of said slots further having a slot configuration which is other than a symmetrical reversal mirror image of itself with respect to both a plane transverse to and a plane parallel with said cable axis with both planes passing through the center of the slot configuration,--

Col. 5, claim 3, line 22, before "said" insert --on--; line 24, after "," insert --each of said slots further having a slot configuration which is other than a symmetrical reversal mirror image of itself with respect to both a plane transverse to and a plane parallel with said cable axis with both planes passing through the center of the slot configuration,--

Col. 6, claim 4, line 9, before "said" insert --on--

UNITED STATES PATENT OFFICE
CERTIFICATE OF CORRECTION

Patent No. 3,766,378         Dated   October 16, 1973

Inventor(s)   Takeshi Baba et al.              Page - 2 -

It is certified that error appears in the above-identified patent and that said Letters Patent are hereby corrected as shown below:

Column 6, line 10, claim 4, after "1" insert the following:

-- each of said slots further having a slot configuration which is other than a symmetrical reversal mirror image of itself with respect to both a plane transverse to and a plane parallel with said cable axis with both planes passing through the center of the slot configuration, --.

Signed and sealed this 19th day of November 1974.

(SEAL)
Attest:

McCOY M. GIBSON JR.                C. MARSHALL DANN
Attesting Officer                  Commissioner of Patents